US012802180B2

(12) United States Patent
Sinha et al.

(10) Patent No.: US 12,802,180 B2
(45) Date of Patent: Nov. 17, 2026

(54) MOTION COMPENSATION IN ANGIOGRAPHIC IMAGES THROUGH TRAINING A GENERATIVE ADVERSARIAL NETWORK TO PREDICT THE COMPOSITE MOTION COMPENSATED DIGITAL SUBTRACTION ANGIOGRAPHIC IMAGES

(71) Applicant: KONINKLIJKE PHILIPS N.V., Eindhoven (NL)

(72) Inventors: Ayushi Sinha, Baltimore, MD (US); Grzegorz Andrzej Toporek, Cambridge, MA (US); Leili Salehi, Waltham, MA (US); Ashish Sattyavrat Panse, Burlington, MA (US); Raoul Florent, Ville d'Avray (FR); Ramon Quido Erkamp, Swampscott, MA (US)

(73) Assignee: Koninklijke Philips N.V., Eindhoven (NL)

( * ) Notice: Subject to any disclaimer, the term of this patent is extended or adjusted under 35 U.S.C. 154(b) by 552 days.

(21) Appl. No.: 18/268,338

(22) PCT Filed: Dec. 21, 2021

(86) PCT No.: PCT/EP2021/087056
§ 371 (c)(1),
(2) Date: Jun. 20, 2023

(87) PCT Pub. No.: WO2022/136411
PCT Pub. Date: Jun. 30, 2022

(65) Prior Publication Data

US 2024/0070825 A1 Feb. 29, 2024

Related U.S. Application Data

(60) Provisional application No. 63/129,275, filed on Dec. 22, 2020.

(51) Int. Cl.
*G06T 5/50* (2006.01)
*G06T 5/73* (2024.01)
*G06T 7/00* (2017.01)

(52) U.S. Cl.
CPC .................. *G06T 5/73* (2024.01); *G06T 5/50* (2013.01); *G06T 7/0012* (2013.01);
(Continued)

(58) Field of Classification Search
CPC ...... A61B 2034/105; A61B 2034/2048; A61B 2034/2051; A61B 2562/02;
(Continued)

(56) References Cited

U.S. PATENT DOCUMENTS 8,825,138 B2 9/2014 Mistretta
9,396,535 B2 7/2016 Miyamoto
(Continued)

FOREIGN PATENT DOCUMENTS

CN 110163809 A 8/2019
EP 3731144 A1 10/2020

OTHER PUBLICATIONS

Isola et al. Title: "Image-to-Image Translation with Conditional Adversarial Networks". Pub Date: Nov. 26, 2018. Berkeley AI Research Laboratory. Pertinent Pages: All pages but the explanation of the PatchGAN on pp. 1-7. (Year: 2018).*
(Continued)

*Primary Examiner* — Chad Dickerson

(57) ABSTRACT

A computer-implemented method of performing motion compensation on a temporal sequence of digital subtraction angiography, DSA, images includes: inputting (S120) a temporal sequence of DSA images (110) into a neural network (120) trained to predict, from the inputted temporal sequence (110), a composite motion-compensated DSA image (130) representing the inputted temporal sequence
(Continued)

(110) and which includes compensation for motion of the vasculature between successive contrast-enhanced images in the temporal sequence, and which also includes compensation for motion of the vasculature between acquisition of contrast-enhanced images in the temporal sequence and acquisition of the mask image; and outputting (S130) the predicted composite motion-compensated DSA image (130).

16 Claims, 5 Drawing Sheets

(52) U.S. Cl.
CPC ............... *G06T 2207/10121* (2013.01); *G06T 2207/20081* (2013.01); *G06T 2207/20084* (2013.01); *G06T 2207/30101* (2013.01); *G06T 2207/30168* (2013.01)

(58) Field of Classification Search
CPC .... A61B 2562/0204; A61B 2562/0219; A61B 2562/0247; A61B 2562/046; A61B 34/20; A61B 5/0002; A61B 5/0004; A61B 5/002; A61B 5/0059; A61B 5/1036; A61B 5/1038; A61B 5/11; A61B 5/1114; A61B 5/112; A61B 5/1121; A61B 5/1127; A61B 5/24; A61B 5/389; A61B 5/4528; A61B 5/4533; A61B 5/4585; A61B 5/6807; A61B 5/6828; A61B 5/6831; A61B 5/6833; A61B 5/72; A61B 5/7267; A61B 5/743; A61B 5/7435; A61B 8/0858; A61B 8/0875; A61B 8/4227; A61B 8/4236; A61B 8/4254; A61B 8/4263; A61B 8/4472; A61B 8/4477; A61B 8/466; A61B 8/467; A61B 8/483; A61B 8/5223; A61B 8/5238; G06N 3/084; G16H 20/30; G16H 40/63; G16H 50/50
USPC .................................................. 382/130–132
See application file for complete search history.

(56) References Cited

U.S. PATENT DOCUMENTS

| | | | | |
|---|---|---|---|---|
| 10,698,063 | B2 | 6/2020 | Braun et al. | |
| 10,970,582 | B2 | 4/2021 | Alletto et al. | |
| 2012/0201439 | A1* | 8/2012 | Rauch | G06T 7/20 382/130 |
| 2019/0333219 | A1* | 10/2019 | Xu | G06T 12/30 |
| 2021/0133984 | A1* | 5/2021 | Sun | G06T 7/248 |
| 2022/0409161 | A1* | 12/2022 | Crabb | A61B 6/5264 |
| 2023/0263493 | A1* | 8/2023 | Cantrell | A61B 6/504 382/131 |

OTHER PUBLICATIONS

Gao et al. Title: "Deep learning-based digital subtraction angiography image generation". Pub. Date: Jul. 31, 2019. International Journal of Computer Assisted Radiology and Surgery Site: https://doi.org/10.1007/s11548-019-02040-x (Year: 2019).*
Ma et al., "Evaluation of motion artifact metrics for coronary CT angiogrpahy", Medical Physics 45(2), Feb. 2018, pp. 687-702.
Fu et al., "Geometry-Consistent Generative Adversarial Networks for One-Sided Unsupervised Domain Mapping", pp. 2427-2436, Proc IEEE Comput Soc Conf Comput Vis Pattern Recognit. 2019.
Benaim et al., "One-Sided Unsupervised Domain Mapping", 31st Conference on Neural Information Processing Systems (NIPS 2017), Long Beach, CA, USA, pp. 1-11.
Zhu et al., "Unpaired Image-to-Image Translation using Cycle-Consistent Adversarial Networks", pp. 2223-2232, (2018).
Buzug et al., "Image Registration for DSA Quality Enhancement", Pergamon, Computerized Medical Imaging and Graphics, 22, (Feb. 17, 1998), pp. 103-113.
Varma et al., "Anaesthetic Considerations for Interventional Neuroradiology", British Journal of Anaesthesia 99 (1):, pp. 75-85 (2007), Jun. 11, 2007.
Frontal knee, Subcutaneous abscess: anterior knee, https://radiopaedia.org/cases/subcutaneous-abscess-anterior-knee-1. Sep. 15, 2020.
Yokoi et al., "Basics of Angiography for Peripheral Artery Disease", pp. 1-37, Angiography and Endovascular Therapy for Peripheral Artery Disease, Ch. 1 (2017).
"Interventional Radiology", Introduction to Radiology, https://www.upstate.edu/radiology/education/rsna/interv/index.php. Sep. 15, 2020.
Varma et al., "Anaesthetic considerations for interventional neuroradiology", BJA: British Journal of Anaesthesia, 99 (1): 75-85 (2007).
Gao et al., "Deep learning-based digital subtraction angiography image generation", Int J CARS 14, pp. 1775-1784 (2019).
Soochahn et al., "Phase-Based Nonrigid Deformation for Digital Subtraction Angiography", Phase-Based Nonrigid Deformation for DSA, vol. 7, 2019, 32265, IEEE Access.
Mahapatra et al., "Deformable Medical Image Registration Using Generative Adversarial Networks", 2018 IEEE 15th International Symposium on Biomedical Imaging (ISBI 2018), Apr. 4-7, 2018, Washington, D.C., USA, pp. 1449-1453.
Villena-Martinez et al., "When Deep Learning Meets Data Alignment: A Review on Deep Registration Networks (DRNs) Applied Sciences", vol. 10, 7524, Issue 21, 2020, pp. 1-20.
Goodfellow et al., "Generative Adversarial Nets", in Advances in nueral information processing systems, pp. 2672-2680, (2014), pp. 1-9.
International Search report and Written Opinion of PCT/EP2021/087056, dated Apr. 22, 2022.

* cited by examiner

MOTION COMPENSATION IN ANGIOGRAPHIC IMAGES THROUGH TRAINING A GENERATIVE ADVERSARIAL NETWORK TO PREDICT THE COMPOSITE MOTION COMPENSATED DIGITAL SUBTRACTION ANGIOGRAPHIC IMAGES

CROSS-REFERENCE TO PRIOR APPLICATIONS

This application is the U.S. National Phase application under 35 U.S.C. § 371 of International Application No. PCT/EP2021/087056, filed on Dec. 21, 2021, which claims the benefit of U.S. Provisional Patent Application Ser. No. 63/129,275, filed on Dec. 22, 2020. These applications are hereby incorporated by reference herein.

TECHNICAL FIELD

The present disclosure relates to performing motion compensation on a temporal sequence of digital subtraction angiography, DSA, images. A computer-implemented method, a processing arrangement, a system, and a computer program product, are disclosed.

BACKGROUND

Digital subtraction angiography "DSA", is a fluoroscopic imaging technique that is used to visualize the vasculature. DSA imaging is commonly used to diagnose vascular conditions such as peripheral artery disease "PAD", and vascular stenosis. DSA imaging is also used during vascular treatment procedures such as aneurism embolization. In a DSA imaging procedure, a mask, or background fluoroscopic image, is acquired by imaging an anatomical region that includes the vasculature, prior to the injection of a radio-opaque contrast agent into a patient. A temporal sequence of contrast-enhanced images, also known as fluoroscopy images, is then acquired by imaging the anatomical region after injecting the contrast agent. The vasculature is highly visible in the fluoroscopic images after injection of the contrast agent. DSA images are obtained by subtracting intensity values in the mask image, from the intensity values in corresponding positions in the temporal sequence of contrast-enhanced images. Radiopaque structures in the anatomy such as bone that are common to both the contrast-enhanced images and the mask image, are removed from the DSA images, whilst the contrast-enhanced vasculature remains highly visible.

DSA imaging procedures are often performed while a patient is conscious. Consequently, DSA images are often affected by motion. Any motion of the vasculature during imaging, for example due to patient motion, cardiac motion, respiratory motion, and so forth can lead to motion artifacts in the resulting DSA images and therefore hamper diagnosis and treatment.

Conventional techniques that have been used to suppress such motion artifacts have focused on improving the registration between the mask image and the contrast-enhanced images. These registration methods often use landmarks in both the mask and contrast enhanced images, for example bone landmarks, to compute either a rigid or deformable registration between the mask and contrast enhanced images before performing the subtraction that provides the DSA images.

However, there remains room to improve motion compensation in DSA images.

SUMMARY

According to one aspect of the present disclosure, a computer-implemented method of performing motion compensation on a temporal sequence of digital subtraction angiography, DSA, images generated by subtracting a mask image, from a temporal sequence of contrast-enhanced images, is provided. The method includes:

receiving a temporal sequence of DSA images;

inputting the temporal sequence of DSA images into a neural network trained to predict, from the inputted temporal sequence, a composite motion-compensated DSA image, the composite motion-compensated DSA image representing the inputted temporal sequence and including compensation for motion of the vasculature between successive contrast-enhanced images in the temporal sequence, and including compensation for motion of the vasculature between acquisition of the contrast-enhanced images in the temporal sequence and acquisition of the mask image; and outputting the predicted composite motion-compensated DSA image.

According to another aspect of the present disclosure, a computer-implemented method of training a generative adversarial network, GAN, comprising a generative model and a discriminative model, to perform motion compensation on a temporal sequence of digital subtraction angiography, DSA, images generated by subtracting a mask image, from a temporal sequence of contrast-enhanced images, is provided. This method includes:

receiving DSA training image data including a plurality of DSA images of the vasculature classified as having motion artifacts, and a plurality of DSA images of the vasculature classified as not having motion artifacts;

inputting, from the received DSA training image data, the DSA images of the vasculature classified as having motion artifacts into the generative model, and in response to the inputting, generating a candidate composite motion-compensated DSA image by comparing the generated composite motion-compensated DSA image with a combined image representing the inputted images, and computing a reconstruction loss based on the comparison;

inputting the candidate composite motion-compensated DSA image into the discriminative model, and in response to the inputting, classifying the inputted candidate composite motion-compensated DSA image as either having motion artifacts or as not having motion artifacts, by comparing the inputted candidate composite motion-compensated DSA image with one or more DSA images of the vasculature classified as not having motion artifacts from the DSA training image data, and computing a discriminator loss based on the comparison; and adjusting parameters of the generative model and the discriminative model based on the reconstruction loss and the discriminator loss, respectively.

Further aspects, features and advantages of the present disclosure will become apparent from the following description of examples, which is made with reference to the accompanying drawings.

DETAILED DESCRIPTION

Figure 1:
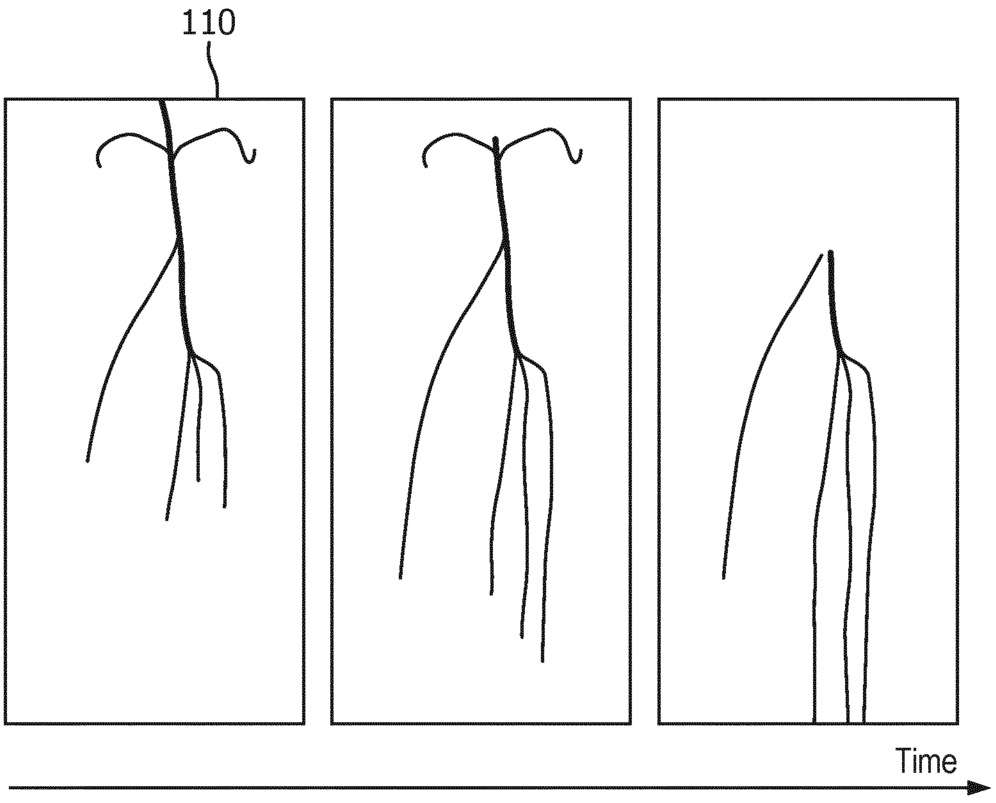
FIG. 1 illustrates an example temporal sequence of DSA images 110 of a leg of a patient.

Examples of the present disclosure are provided with reference to the following description and the figures. In this description, for the purposes of explanation, numerous specific details of certain examples are set forth. Reference in the specification to "an example", "an implementation" or similar language means that a feature, structure, or characteristic described in connection with the example is included in at least that one example. It is also to be appreciated that features described in relation to one example may also be used in another example, and that all features are not necessarily duplicated in each example for the sake of brevity. For instance, features described in relation to a computer-implemented method may be implemented in a processing arrangement, and in a system, and in a computer program product, in a corresponding manner.

In the following description, reference is made to computer implemented methods that involve performing motion compensation on a temporal sequence of digital subtraction angiography, DSA, images. Reference is made to DSA images that are generated from a fluoroscopic, i.e. live X-ray, imaging procedure. The methods disclosed herein may be used to perform compensation in real-time on the DSA images. The methods may also be used to perform compensation on the DSA images at a point in time some seconds, minutes, hours, or days after their acquisition. In other words, whilst the DSA images may be generated from a live X-ray imaging procedure, the motion compensation may be performed some seconds, minutes, hours, or days, later in time. The fluoroscopic or DSA images may for example be stored on a computer readable storage medium, and subsequently retrieved from the storage medium at the later point in time, at which point the methods may be applied to the fluoroscopic or DSA images. In some examples, reference is made to DSA images of a leg of a patient during a clinical investigation for peripheral artery disease. However, it is to be appreciated that the methods disclosed herein are not limited to DSA images of the leg, or to peripheral artery disease. The methods may be used to compensate for motion in DSA images generated for regions of the body in general, including for example in regions such as the heart, brain, chest, and so forth. In some examples, reference is made to performing motion compensation for patient motion. However, it is to be appreciate that the methods disclosed herein may be used to compensate for motion in general, and are not limited to compensation for patient motion. For example, the methods disclosed herein may be used to compensate for motion in the form of cardiac motion, respiratory motion, motion in the vasculature due to the introduction of an interventional device, and so forth. In some examples, reference is made to performing motion compensation in two-dimensional "2D" DSA images, i.e. projection images. However, it is also to be appreciated that the methods disclosed herein may likewise be used to perform motion compensation in three-dimensional "3D" images, i.e. volumetric images, such as images generated by 3D rotational angiography, and so forth.

It is noted that the computer-implemented methods disclosed herein may be provided as a non-transitory computer-readable storage medium including computer-readable instructions stored thereon which, when executed by at least one processor, cause the at least one processor to perform the method. In other words, the computer-implemented methods may be implemented in a computer program product. The computer program product can be provided by dedicated hardware or hardware capable of running the software in association with appropriate software. When provided by a processor or "processing arrangement", the functions of the method features can be provided by a single dedicated processor, by a single shared processor, or by a plurality of individual processors, some of which can be shared. The explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non-volatile storage device, and the like. Furthermore, examples of the present disclosure can take the form of a computer program product accessible from a computer usable storage medium or a computer-readable storage medium, the computer program product providing program code for use by or in connection with a computer or any instruction execution system. For the purposes of this description, a computer-usable storage medium or computer-readable storage medium can be any apparatus that can comprise, store, communicate, propagate, or transport a program for use by or in connection with an instruction execution system, apparatus, or device. The medium can be an electronic, magnetic, optical, electromagnetic, infrared, or semiconductor system or device or propagation medium. Examples of computer-readable media include semiconductor or solid-state memories, magnetic tape, removable computer disks, random access memory "RAM", read only memory "ROM", rigid magnetic disks, and optical disks. Current examples of optical disks include compact disk-read only memory "CD-ROM", optical disk-read/write "CD-R/W", Blu-Ray™, and DVD.

FIG. 1 illustrates an example temporal sequence of DSA images 110 of a leg of a patient. The DSA images 110 in FIG. 1 illustrate the flow of a previously injected radiopaque contrast agent in the vasculature in the leg, over time. As time progresses from left to right in FIG. 1, the contrast agent can be seen to advance downwards into branches of the vasculature. DSA images such as the DSA images 110 illustrated in FIG. 2 may be obtained whilst performing a clinical investigation for the presence of peripheral artery disease "PAD". PAD is a common condition where a build-up of fatty deposits in the arteries restricts blood supply to leg muscles.

The DSA images 110 illustrated in FIG. 1 may be obtained by generating a mask, or background, fluoroscopic image, prior to the injection of the radio-opaque contrast agent into a patient, and subtracting the intensity values in the mask image, from the intensity values at corresponding positions in each image in a temporal sequence of contrast-enhanced fluoroscopic images that are obtained after injection of the radio-opaque contrast agent. The vasculature is highly visible in the fluoroscopic images after injection of the contrast agent, and consequently they are often known as angiographic images. Radiopaque structures such as bone that are common to both the contrast-enhanced images, and the mask image, are removed from the resulting DSA images, whilst the contrast-enhanced vasculature remains highly visible. Consequently, DSA images provide an accurate depiction of the vasculature. A variety of image registration techniques may be used to align the mask image with the temporal sequence of contrast-enhanced angiographic images prior to subtracting their intensity values.

Figure 2:
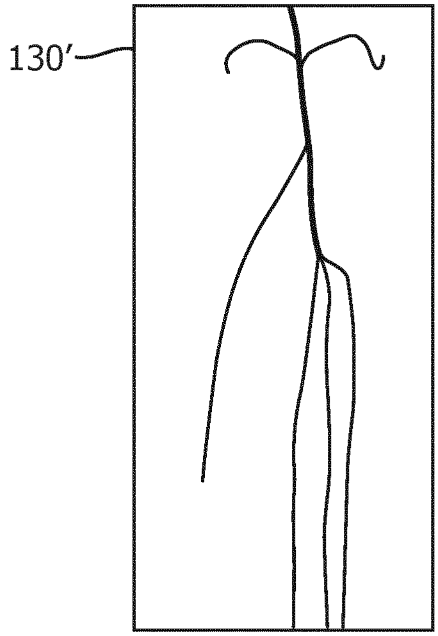
FIG. 2 illustrates an example composite DSA image 130' representing the temporal sequence of DSA images 110 of the leg of the patient in FIG. 1.

Having obtained DSA images of a region of interest, DSA images such as the DSA images 110 illustrated in FIG. 1 may be combined to provide a composite DSA image that represents the temporal sequence. Thereto, FIG. 2 illustrates an example composite DSA image 130' representing the temporal sequence of DSA images 110 of the leg of the patient in FIG. 1. A composite DSA image may represent the maximum value, or the minimum value, or the average value, of the image intensity values in the DSA images in the temporal sequence. A composite DSA image is sometimes known as a trace image. In some examples, a composite DSA image may be obtained by computing the maximum image intensity value, or the minimum image intensity value, or the average image intensity value, at corresponding positions along the vasculature in the DSA images. For example, a composite DSA image may be obtained by computing these values at positions along the centerline of each branch of the vasculature, or from an average of the values computed across the centerline at positions along the centerline of each branch of the vasculature, for one or more DSA images in the temporal sequence. The composite DSA image 130' illustrated in FIG. 2 may subsequently be analyzed by a physician in order to investigate the pathology of a disease, such as PAD, for example.

However, motion from various sources may confound the analysis of composite DSA images such as the composite DSA image 130' illustrated in FIG. 2. Motion from for example patient movement, or cardiac motion, or respiratory motion, may for example affect the quality of the resulting DSA images.

Figure 3:
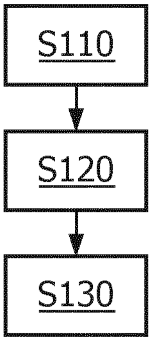
FIG. 3 is a flowchart illustrating an example method of performing motion compensation on a temporal sequence of DSA images, in accordance with some aspects of the present disclosure.

The inventors have determined a method of performing motion compensation on a temporal sequence of DSA images. FIG. 3 is a flowchart illustrating an example method of performing motion compensation on a temporal sequence of DSA images, in accordance with some aspects of the present disclosure. With reference to FIG. 3, a computer-implemented method of performing motion compensation on a temporal sequence of digital subtraction angiography, DSA, images generated by subtracting a mask image, from a temporal sequence of contrast-enhanced images, includes:

receiving S110 a temporal sequence of DSA images 110;

inputting S120 the temporal sequence of DSA images 110 into a neural network 120 trained to predict, from the inputted temporal sequence 110, a composite motion-compensated DSA image 130, the composite motion-compensated DSA image 130 representing the inputted temporal sequence 110 and including compensation for motion of the vasculature between successive contrast-enhanced images in the temporal sequence, and including compensation for motion of the vasculature between acquisition of the contrast-enhanced images in the temporal sequence and acquisition of the mask image; and outputting S130 the predicted composite motion-compensated DSA image 130.

Advantageously, the method results in a single image in which motion is compensated-for; i.e. the predicted composite motion-compensated DSA image 130.

Figure 4:
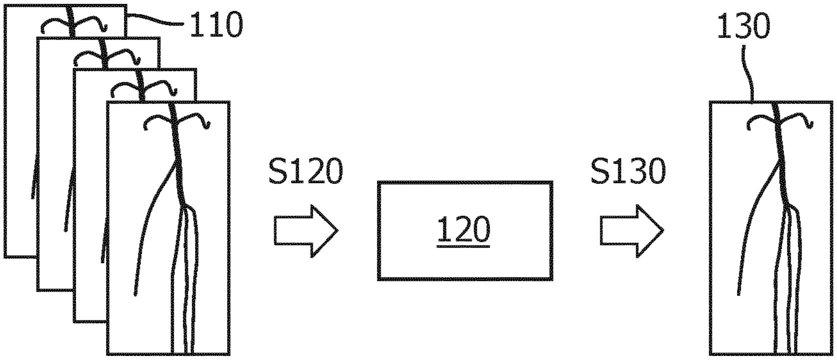
FIG. 4 is a schematic diagram illustrating an example method of performing motion compensation on a temporal sequence of DSA images, in accordance with some aspects of the present disclosure.

FIG. 4 is a schematic diagram illustrating an example method of performing motion compensation on a temporal sequence of DSA images, in accordance with some aspects of the present disclosure. FIG. 4 illustrates schematically the operations in FIG. 3.

With reference to the above method, the temporal sequence of DSA images 110 received in operation S110 may be received from various sources, including a database, an X-ray or computed tomography imaging system, a computer readable storage medium, the cloud, and so forth. The data may be received using any form of data communication, such as wired or wireless data communication, and may be via the internet, an ethernet, or by transferring the data by means of a portable computer-readable storage medium such as a USB memory device, an optical or magnetic disk, and so forth.

In some examples, the images in the temporal sequence of contrast-enhanced images are registered to the mask image prior to generating the DSA images. The registration may for example include a rigid, or an affine, or a deformable, registration, and so forth. This registration may remove some motion artifacts that arise from small rotations or shifts of the vasculature. This may improve the predicted composite motion-compensated DSA image 130 that is provided by the above method.

With reference to FIG. 3 and FIG. 4, the operation S120 includes inputting the temporal sequence of DSA images 110 into a neural network 120. The use of various types of neural networks is contemplated in this respect. As described in more detail below, the neural network 120 may include elements of a generative adversarial network, i.e. a "GAN". The neural network 120 may alternatively and/or additionally include elements of other types of neural networks, including for example a convolutional neural network, i.e. a "CNN", and/or a recurrent neural network, i.e. a "RNN" such as a unidirectional or bidirectional long short-term memory "LSTM" architecture, and/or a temporal convolutional network, i.e. a "TCN", and/or an encoder-decoder network, and/or a transformer.

With continued reference to FIG. 3 and FIG. 4, the operation S130 includes outputting the predicted composite motion-compensated DSA image 130. The predicted composite motion-compensated DSA image 130 may for example be outputted to a display device, or to a computer readable storage medium, a printer, and so forth.

As mentioned above, the use of various types of neural networks is contemplated for neural network 120 illustrated in FIG. 4. Neurons are the basic unit of a neural network. A neuron has one or more data inputs and generates an output based on the input(s). In operation, the data inputs are multiplied by corresponding weights and summed together along with a bias term. The summed result is inputted into an activation function in order to determine the output of the neuron. The bias term shifts the activation function left or right and implicitly sets a threshold to the neuron's activation, thereby controlling the output of the neuron. The weights determine the strength of the connections between the neurons in the network. The weights, the biases, and the neuron connections are examples of "trainable parameters" of the neural network that are "learnt", or in other words, capable of being trained, during a neural network "training" process. Various activation functions may be used, such as a Sigmoid function, a Tanh function, a step function, Rectified Linear Unit "ReLU", leaky ReLU, Softmax and a Swish function.

The process of training a neural network includes automatically adjusting the above-described weights and biases. Supervised learning involves providing a neural network with a training dataset that includes input data and corresponding expected output data. The training dataset is representative of the input data that the neural network will likely be used to analyses after training. During supervised learning, the weights and the biases are automatically adjusted such that when presented with the input data, the neural network accurately provides the corresponding expected output data.

Training a neural network typically involves inputting a large training dataset into the neural network, and iteratively adjusting the neural network parameters until the trained neural network provides an accurate output. Training is usually performed using a Graphics Processing Unit "GPU" or a dedicated neural processor such as a Neural Processing Unit "NPU" or a Tensor Processing Unit "TPU". Training therefore typically employs a centralized approach wherein cloud-based or mainframe-based neural processors are used to train a neural network. Following its training with the training dataset, the trained neural network may be deployed to a device for analyzing new input data; a process termed "inference". The processing requirements during inference are significantly less than those required during training, allowing the neural network to be deployed to a variety of systems such as laptop computers, tablets, mobile phones and so forth. Inference may for example be performed by a Central Processing Unit "CPU", a GPU, an NPU, a TPU, on a server, or in the cloud.

As mentioned above, in supervised learning, the weights and the biases are automatically adjusted, such that when presented with the input training data, the neural network accurately provides the corresponding expected output data. The value of a loss function, or error, is computed based on a difference between the predicted output data and the expected output data. The value of the loss function may be computed using functions such as the negative log-likelihood loss, the mean squared error, mean absolute error, the Huber loss, Dice coefficient loss, or the cross entropy loss. Loss functions that are specific to GANs include discriminator loss, minimax GAN loss, non-saturating GAN loss, alternate GAN loss, least squares GAN loss, and Wasserstein GAN loss. During training, the value of the loss function is typically minimized, and training is terminated when the value of the loss function satisfies a stopping criterion. Sometimes, training is terminated when the value of the loss function satisfies one or more of multiple criteria. Various methods are known for solving this minimization problem such as gradient descent, Quasi-Newton methods, and so forth. Various algorithms have been developed to implement these methods and their variants including but not limited to Stochastic Gradient Descent "SGD", batch gradient descent, mini-batch gradient descent, Gauss-Newton, Levenberg Marquardt, Momentum, Adam, Nadam, Adagrad, Adadelta, RMSProp, and Adamax "optimizers".

These algorithms compute the derivative of the loss function with respect to the model parameters using the chain rule. This process is called backpropagation since derivatives are computed starting at the last layer or output layer, moving toward the first layer or input layer. These derivatives inform the algorithm how the model parameters must be adjusted in order to minimize the error function. That is, adjustments to model parameters are made starting from the output layer and working backwards in the network until the input layer is reached. In a first training iteration, the initial weights and biases are often randomized. The neural network then predicts the output data, which is likewise, random. Backpropagation is then used to adjust the weights and the biases. The training process is performed iteratively by making adjustments to the weights and biases in each iteration. Training is terminated when the error, or difference between the predicted output data and the expected output data, is within an acceptable range for the training data, or for some validation data. Subsequently the neural network may be deployed, and the trained neural network makes predictions on new input data using the trained values of its parameters. If the training process was successful, the trained neural network accurately predicts the expected output data from the new input data.

In general, the neural network 120 described above with reference to FIG. 3 and FIG. 4 may be trained to predict, from the inputted temporal sequence 110, the composite motion-compensated DSA image 130, by:

- receiving DSA training image data 200 including a plurality of DSA images of the vasculature classified as not having motion artifacts 210, and a plurality of DSA images of the vasculature classified as having motion artifacts 220; and
- inputting the DSA images of the vasculature classified as having motion artifacts 220 from the DSA training image data 200, into the neural network 120, and adjusting parameters of the neural network 120 based on a first loss function representing a difference between a composite motion-compensated DSA image 130 predicted by the neural network 120, and a combined image representing the inputted DSA training image data 200, and based on a second loss function representing a probability of the composite motion-compensated DSA image 130 predicted by the neural network 120 corresponding to a DSA image of the vasculature classified as not having motion artifacts 210 from the DSA training image data 200.

The DSA training image data 200 in this method includes DSA images that are classified as having, i.e. including, motion artifacts 220, and images that are classified as not having motion artifacts 210. The DSA training image data 200 may for example include composite DSA images that are classified as having motion artifacts 220, and composite DSA images that are classified as not having motion artifacts 210. The neural network 120 uses the DSA training image data 200 to learn to predict composite motion-compensated DSA images.

By way of some examples, the DSA images of the vasculature classified as not having motion artifacts 210, may be generated for use in the DSA training image data 200 using any of the following methods:

- generated from patients during angiographic image acquisition and labelled by an expert as not having motion artifacts following visual inspection, for example these images may be generated from anesthetized patients;
- generated by imaging a phantom and/or a cadaver by ensuring no motion was present during image acquisition;
- generated from a simulation of contrast agent flow through a model of the vasculature;
- generated using datasets with minor motion artefacts that were successfully corrected with motion artifact correction/reduction methods.

Figure 5:
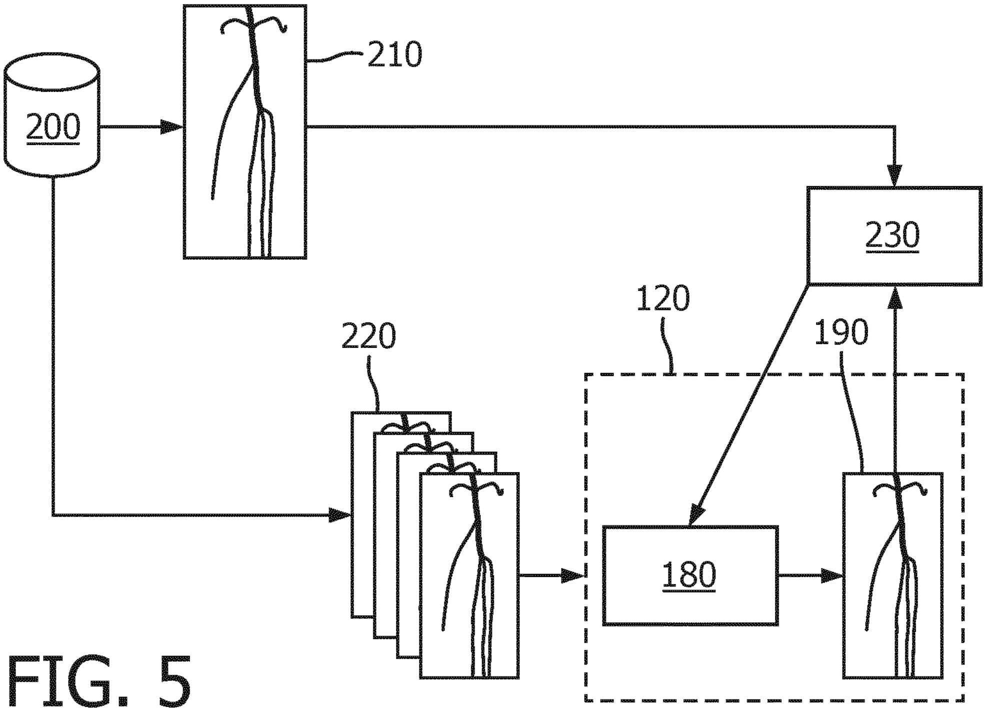
FIG. 5 is a schematic diagram illustrating an example method of training a neural network 120 to perform motion compensation on a temporal sequence of DSA images, in accordance with some aspects of the present disclosure.

Likewise, the DSA images of the vasculature classified as having motion artifacts 220, may be generated for use in the DSA training image data 200 using any of the following methods:

- generated from patients during angiographic image acquisition and labelled by an expert as including artifacts following visual inspection;
- generated by imaging a phantom and/or a cadaver and artificially introducing motion during or following image acquisition;
- generated from a simulation of contrast agent flow through a model of the vasculature and simulating perturbed contrast agent flow In accordance with another example, the neural network 120 includes a generative model. The generative model may be provided by the generator portion of a GAN. This example is described with reference to FIG. 5, which is a schematic diagram illustrating an example method of training a neural network 120 to perform motion compensation on a temporal sequence of DSA images, in accordance with some aspects of the present disclosure. It is noted that FIG. 5 relates to training a neural network 120, and that whilst FIG. 5 includes a discriminative model 230, that this discriminative model 230 is only used during training, and is not required during inference. Thus, the discriminative model 230 illustrated in FIG. 5 is not required when performing motion compensation on a temporal sequence of digital subtraction angiography, DSA, images.

In accordance with this example, the neural network 120 comprises:

- a generative model 180 trained to predict, from the inputted temporal sequence of DSA images 110, a candidate composite motion-compensated DSA image 190 representing the inputted temporal sequence of DSA images 110, and including compensation for the motion of the vasculature between successive contrast-enhanced images in the temporal sequence, and including compensation for motion of the vasculature between the acquisition of the contrast-enhanced images in the temporal sequence and the acquisition of the mask image; and
- wherein the neural network 120 is configured to output the candidate composite motion-compensated DSA image to provide the composite motion-compensated DSA image 130.

The inventors have recognized that motion of the vasculature, which may for example be caused by patient motion or another motion, results in motion of the vasculature between successive contrast-enhanced images in the temporal sequence, as well as between the acquisition of the contrast-enhanced images in the temporal sequence and the acquisition of the mask image. Consequently, by providing a candidate composite motion-compensated DSA image 190 that compensates for motion from both of these sources, neural network 120 provides an improved composite DSA image.

The method illustrated schematically in FIG. 5 may be used to train the example neural network 120 mentioned above. As illustrated in FIG. 5, the neural network 120 includes a generative model 180. A separate discriminative model 230 is also illustrated in FIG. 5, and this is used during the training of the neural network 120, but is not required for executing the trained neural network. In other words, the discriminative model 230 illustrated in FIG. 5 does not form part of the neural network 120 that is used to perform inference.

Together, the generative model 180 and the discriminative model 230 illustrated in FIG. 5, represent a GAN. The goal of training a GAN such as that illustrated in FIG. 5 is to train the generative model to reliably generate candidate predictions based on inputted data that trick the discriminative model, into classifying the candidate predictions with a particular classification. A GAN is provided with training data in the form of a dataset that is separated into two subsets. In the present example, training may be performed with one subset of images that are classified as having motion artifacts, and which serve as inputs to the generator, and another subset of images that are classified as not having motion artifacts, and which serve as inputs to the discriminator and which represent the desired type of output expected from the trained GAN. The discriminative model uses the training data without motion artifacts to improve its classification of the generated data from the generator. The classification task is to label the generated output of the generator as “real” or “artificial”. A generated output is labelled as real if it is representative of the training data without motion artifacts, and artificial if it is not representative of the training data without motion artifacts, i.e., it includes motion artifacts. The discriminator loss is computed and fed back to the generative model to help the generative model improve its predictions by penalizing the generator for generating an output classified by the discriminator as artificial. As the GAN is trained, it learns to generate outputs that are representative of the training data without motion artifacts, i.e., outputs that the discriminator classifies as real. The advantage of using a GAN in this example is that GANs do not require paired training data; i.e. pairs of images wherein one image represent a view of the anatomy and includes motion artifacts and the other image, which represents the same view of the anatomy does not include motion artifacts. Nor is it necessary to perform segmentation of the artifacts in the images.

The generative model 180 described with reference to FIG. 5 method is capable of processing temporal sequences of images. This may be achieved by various methods. For instance, sequences of images may be treated as volumes, and the neural network uses 3D convolutions in a regular convolutional neural network “CNN”. Alternatively, sequences of images may be fed into a 2D CNN, wherein each image in the sequence is input as a separate channel and each feature map operates on the separate channels. Dependencies between these channels may be captured by pixel-wise, 1×1, convolutions or fully connected layers in the network. Alternatively, the temporal aspect of the sequence may be captured using 2D convolutions in a recurrent neural network with a unidirectional or bidirectional long short-term memory architecture, etc. or in a temporal convolutional network which uses causal convolutions or convolutions where an output at a particular time, t, is convolved only with elements up to that time, [0, . . . , t], in the previous layer.

In some examples, confidence estimates may be assigned to the predicted motion-compensated image(s). These estimates may be determined via the strength of the most activated output unit of the discriminators. For instance, if the discriminator classifies the generated image as real with a normalized activation>0.9, the neural network has high confidence that the generated image has reduced motion artifacts. However, if the generated image is classified as real with a normalized activation of say 0.55, then the neural network has low confidence that the generated image is artefact-free. If the normalized activation for the "real" class is <0.5, i.e., the image is classified as artificial, then the generated image is not sufficiently artefact-free. By computing a loss between the generator confidence and the most activated unit of the discriminator, the generator learns what kinds of features are associated with "real" or more confident outputs and what features are associated with less confidence.

Confidence may also be estimated via the cycle consistency loss. That is, if the cycle consistency loss is large, the neural network has lower confidence that the anatomical structure of the input image is maintained. By contrast, a lower cycle consistency loss implies the anatomical structure was maintained in the artefact-free image, implying higher network confidence. Similarly, estimates for confidence can be obtained using distance GANs, geometry consistent GANs, or other methods that enforce spatial and/or anatomical constraints. The overall confidence can also be computed from a combination of the network's certainty in having removed artifacts and in having retained the anatomical structure being imaged. Alternatively, one or a combination of motion artifact metrics may be used to compute the confidence in a generated image or image sequence. The confidence in a sequence may be estimated for the sequence or per image in the sequence, which can then be combined to produce an overall confidence value for the sequence. Confidence or uncertainty may also be computed using "dropout" in the generator and/or discriminator networks. Dropout randomly "drops" or neglects the outputs of some neurons in the network and repeats inference on an input multiple times producing slightly different predictions. The mean and variance of the predictions can be computed, with the variance indicating the uncertainty in the mean output. For instance, high variance indicates high uncertainty or low confidence.

With reference to FIG. 5, DSA training image data 200 may be stored on, and thus retrieved from, a computer readable storage medium in order to train the neural network 120. The DSA training image data 200 includes DSA images of the vasculature classified as having motion artifacts 220, and DSA images of the vasculature classified as not having motion artifacts 210. The images in the training image data 200 may include temporal sequences and/or individual images. The images may include DSA images and/or composite DSA images and/or angiographic images. During training, groups of DSA images of the vasculature that are classified as having motion artifacts 220 are selected from the DSA training image data 200 and inputted into the neural network 120. The generative model 180 predicts, from the inputted images, a candidate composite motion-compensated DSA image 190, and the discriminative model 230 classifies the candidate composite motion-compensated DSA image 190. The discriminative model 230 performs the classification by comparing each predicted candidate composite motion-compensated DSA image 190 with a random image selected from the DSA training image data that is classified as not having motion artifacts 210. The training process is repeated iteratively, by in each iteration inputting a group of DSA images of the vasculature classified as having motion artifacts 220, and adjusting the parameters, i.e. the weights and biases, of the generative model 180 and the discriminative model 230, based on a value of a loss function, the "reconstruction loss", which is computed for the generative model, and a value of another loss function, the "discriminator loss", which is computed for the discriminative model. These loss functions may be computed using any of the aforementioned loss functions. By convention, the value of a loss function is typically minimized during training, and in the present example a relatively closer comparison results in a relatively lower value of the loss function.

Thus, in this FIG. 5 example, the neural network 120 is trained to predict, from the inputted temporal sequence 110, the composite motion-compensated DSA image 130, by:

providing a discriminative model 230, and training the generative model 180 to predict, from the inputted temporal sequence of DSA images 110, a candidate composite motion-compensated DSA image 190 representing the inputted temporal sequence of DSA images 110, by:

receiving DSA training image data 200 including a plurality of DSA images of the vasculature classified as having motion artifacts 220, and a plurality of DSA images of the vasculature classified as not having motion artifacts 210;

inputting, from the received DSA training image data 200, the DSA images of the vasculature classified as having motion artifacts 220 into the generative model 180, and in response to the inputting, generating a candidate composite motion-compensated DSA image 190 by comparing the generated composite motion-compensated DSA image 190 with a combined image representing the inputted images, and computing a reconstruction loss based on the comparison;

inputting the candidate composite motion-compensated DSA image 190 into the discriminative model 230, and in response to the inputting, classifying the inputted candidate composite motion-compensated DSA image as either having motion artifacts or as not having motion artifacts, by comparing the inputted candidate composite motion-compensated DSA image 190 with one or more DSA images of the vasculature classified as not having motion artifacts 210 from the DSA training image data 200, and computing a discriminator loss based on the comparison; and adjusting parameters of the generative model 180 and the discriminative model 230 based on the reconstruction loss, and the discriminator loss, respectively.

The combined image may be generated by, for example, determining minimum or maximum values of the image intensities in the group of inputted images, or by averaging the image intensities in the group of inputted images, and so forth.

Figure 6:
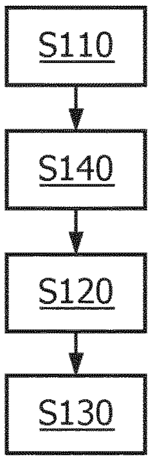
FIG. 6 is a flowchart illustrating an example method of performing motion compensation on a temporal sequence of DSA images, in accordance with some aspects of the present disclosure.
Figure 7:
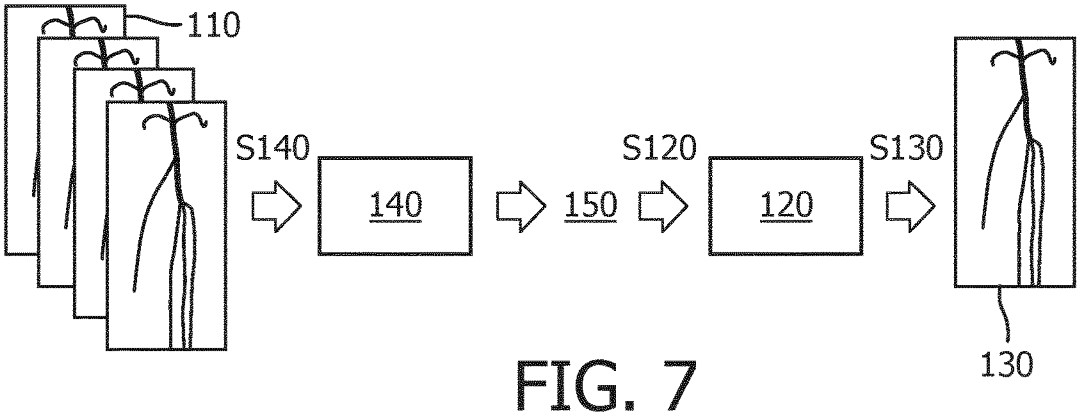
FIG. 7 is a schematic diagram illustrating an example method of performing motion compensation on a temporal sequence of DSA images, in accordance with some aspects of the present disclosure.

In accordance with another example, two neural networks are provided for performing motion compensation on a temporal sequence of DSA images. This example is described with reference to FIG. 6-FIG. 8. FIG. 6 is a flowchart illustrating an example method of performing motion compensation on a temporal sequence of DSA images, in accordance with some aspects of the present disclosure. FIG. 7 is a schematic diagram illustrating an example method of performing motion compensation on a temporal sequence of DSA images, in accordance with some aspects of the present disclosure. With reference to FIG. 7, in this example, a first neural network 140 is trained to predict, from an inputted temporal sequence 110 of DSA images 110, a corresponding temporal sequence of motion-compensated DSA images 150 that include compensation for motion of the vasculature between the acquisition of each contrast-enhanced image in the temporal sequence and the acquisition of the mask image. A second neural network 120 receives the temporal sequence of motion-compensated DSA images 150, and uses this sequence to predict a composite motion-compensated DSA image 130 that includes compensation for motion of the vasculature between successive contrast-enhanced images in the temporal sequence. In the FIG. 6-FIG. 8 example, the second neural network 120 may be provided by the neural network 120 described above in the previous example with reference to FIG. 5. In accordance with the FIG. 6-FIG. 8 example, the neural network 120 described with reference to FIG. 5 represents a second neural network 120, and as illustrated in FIG. 6, the method described with reference to FIG. 3 further includes:

inputting S140 the temporal sequence of DSA images 110 into a first neural network 140 trained to predict, from the inputted temporal sequence 110, a corresponding temporal sequence of motion-compensated DSA images 150 that include compensation for motion of the vasculature between the acquisition of each contrast-enhanced image in the temporal sequence and the acquisition of the mask image; and wherein the inputting S120 the temporal sequence of DSA images 110 into a neural network 120, comprises: inputting the predicted temporal sequence of motion-compensated DSA images 150, into the second neural network 120, such that the composite motion-compensated DSA image 130 predicted by the second neural network 120 represents the predicted temporal sequence of motion-compensated DSA images 150 and includes compensation for motion of the vasculature in the predicted temporal sequence of motion-compensated DSA images 150 arising from corresponding motion of the vasculature between successive contrast-enhanced images in the temporal sequence.

Advantageously, in this example, the second neural network 120 compensates for motion-induced misalignment between the individual motion-compensated images that are generated by the first neural network 140. For example, the individual motion-compensated images generated by the first neural network 140 may not be well aligned to each other due to motion during acquisition of the angiographic images. In so doing, motion artifacts are reduced in the composite motion-compensated DSA image 130 predicted by the second neural network 120.

In this example, the first neural network 140 comprises: a first generative model 160 trained to predict, for each inputted DSA image in the temporal sequence, a candidate DSA image 170 that includes compensation for the motion of the vasculature between the acquisition of the corresponding contrast-enhanced image in the temporal sequence and the acquisition of the mask image. The second neural network 120 comprises: a second generative model 180 configured to receive the candidate DSA images 170 predicted by the first generative model, and to predict, from the received candidate DSA images 170, a candidate composite motion-compensated DSA image 190 representing the received candidate DSA images 170, and including compensation for motion of the vasculature between successive contrast-enhanced images in the received candidate DSA images 170. The second neural network 120 is configured to output the candidate composite motion-compensated DSA image 190 to provide the composite motion-compensated DSA image 130.

Figure 8:
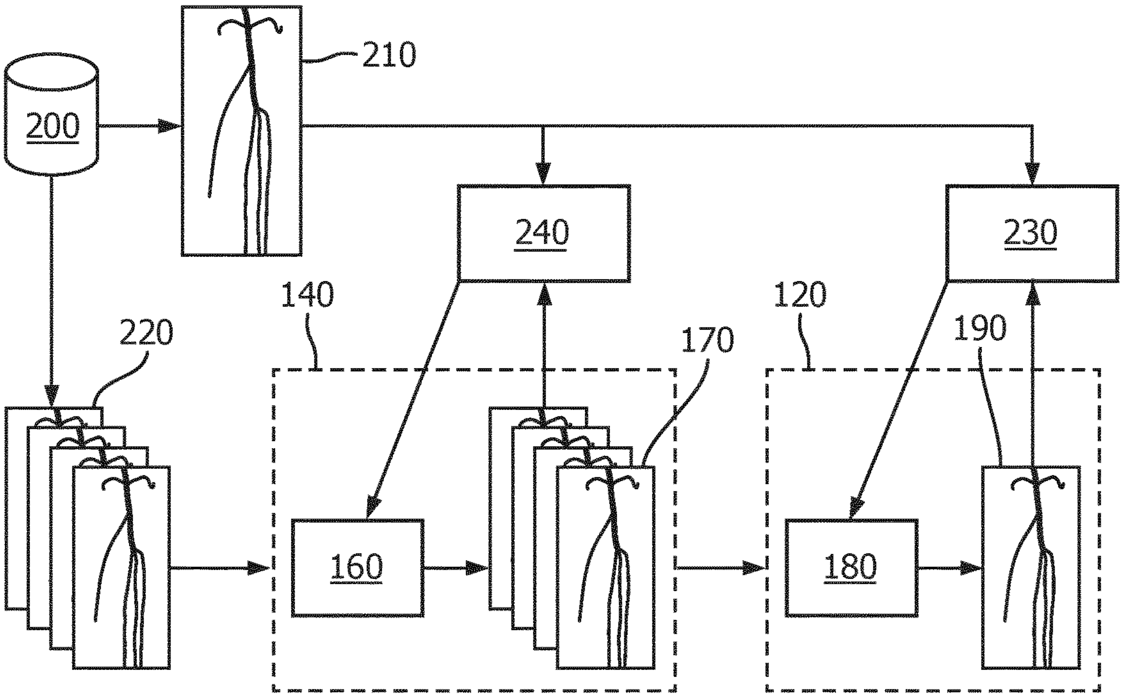
FIG. 8 is a schematic diagram illustrating an example method of training a first neural network 120 and a second neural network 140 to perform motion compensation on a temporal sequence of DSA images, in accordance with some aspects of the present disclosure.

This example is illustrated in FIG. 8, which is a schematic diagram illustrating an example method of training a first neural network 120 and a second neural network 140 to perform motion compensation on a temporal sequence of DSA images, in accordance with some aspects of the present disclosure. It is noted that FIG. 8 relates to training the neural networks 120, 140, and that whilst FIG. 8 includes a first discriminative model 240 and a second discriminative model 230, that these are only used during training, and that they are not required during inference, i.e. when performing motion compensation on a temporal sequence of digital subtraction angiography, DSA, images.

In the FIG. 8 neural network, the second neural network 120 may be trained to predict, from the inputted temporal sequence 110, the composite motion-compensated DSA image 130, by:

providing a first discriminative model 240, and training the first generative model 160 to predict, for each inputted DSA image in the temporal sequence, a candidate DSA image 170 that includes compensation for the motion of the vasculature between the acquisition of the corresponding contrast-enhanced image in the temporal sequence and the acquisition of the mask image, by:

receiving DSA training image data 200 including a plurality of DSA images of the vasculature classified as having motion artifacts 220, and a plurality of DSA images of the vasculature classified as not having motion artifacts 210;

inputting, from the received DSA training image data 200, the DSA images of the vasculature classified as having motion artifacts 220 into the first generative model 160, and in response to the inputting, generating for each inputted image, a candidate DSA image 170 that includes compensation for motion of the vasculature between the acquisition of the corresponding contrast-enhanced image and the acquisition of the mask image, by comparing each generated candidate DSA image 170 with the corresponding inputted DSA image of the vasculature from the received DSA training image data 200, and computing a first reconstruction loss based on the comparison;

inputting the candidate DSA image 170 into the first discriminative model 240, and in response to the inputting, classifying the inputted candidate DSA image 170 as either having motion artifacts or as not having motion artifacts, by comparing the inputted candidate DSA image 170 with one or more DSA images of the vasculature classified as not having motion artifacts 210 from the DSA training image data 200, and computing a first discriminator loss based on the comparison;

adjusting parameters of the first generative model 160 and the first discriminative model 240 based on the first reconstruction loss and the first discriminator loss, respectively;

providing a second discriminative model 230, and training the second generative model 180 to predict a candidate composite motion-compensated DSA image 190, by:

inputting the temporal sequence of candidate DSA images 170 generated by the first generative model 160 into the second generative model 180, and in response to the inputting, generating a candidate composite motion-compensated DSA image 190 by comparing the generated composite motion-compensated DSA image 190 with a combined image representing the inputted images, and computing a second reconstruction loss based on the comparison;

inputting the candidate composite motion-compensated DSA image 190 into the second discriminative model 230, and in response to the inputting, classifying the inputted candidate composite motion-compensated DSA image 190 as either having motion artifacts or as not having motion artifacts, by using the second discriminative model 230 to compare the inputted candidate composite motion-compensated DSA image 190 with one or more DSA images classified as not having motion artifacts 210 from the DSA training image data 200, and computing a second discriminator loss based on the comparison; and adjusting parameters of the second generative model 180 and the second discriminative model 230 based on the second reconstruction loss, and the second discriminator loss, respectively.

Figure 9:
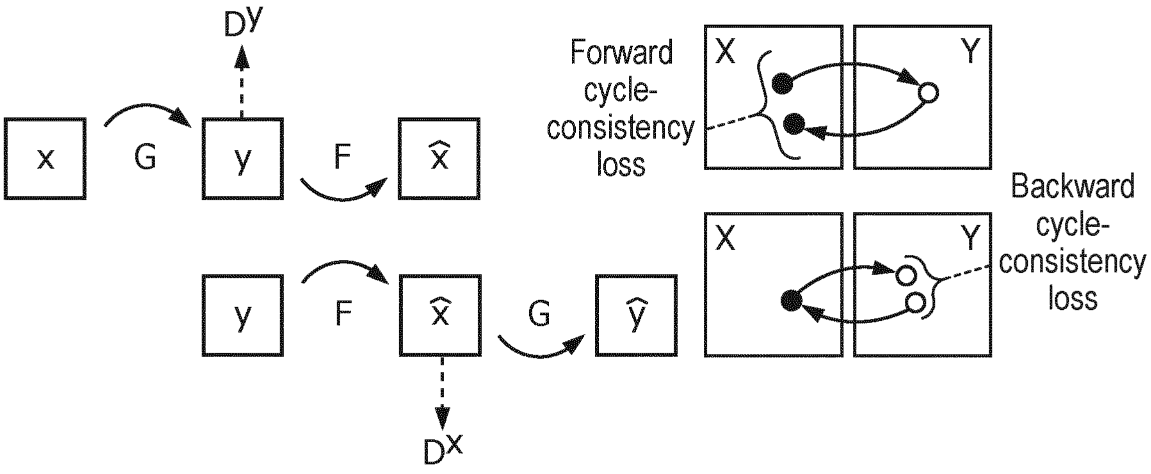
FIG. 9 is a schematic diagram illustrating an example method of enforcing cycle consistency, in accordance with some aspects of the present disclosure.

During training of the GANs 120, 140 described above with reference to FIG. 5 and FIG. 8, the reconstruction loss may be a cycle consistency loss. Cycle-consistency may be enforced in order to constrain the mapping learned by the generator so that the generator can retain anatomical structure while generating an artefact-free image. Maintaining spatial constancy between the input and generated image is important for medical images, and the original cycle consistency loss may be modified to enforce stronger spatial constancy by replacing the L1 loss with structural similarity loss SSIM, dice loss over binary segmentations of the vasculature, and so forth. Alternatively, other methods that enforce spatial constancy like distance GAN, geometry consistent GAN, and so forth may be used. Thereto, FIG. 9 is a schematic diagram illustrating an example method of enforcing cycle consistency, in accordance with some aspects of the present disclosure. With reference to FIG. 9, cycle consistency constrains the space of the predicted image, y, via the constraint that a second generator, F, should be able to recover the input image, denoted $\hat{x}$ as an approximation. The error between input image, x, and $\hat{x}$ is the forward cycle consistency loss. A second cycle consistency loss is computed by enforcing the additional constraint that the generator, G, that produced y from the input image, x, can reproduce y, denoted $\hat{y}$ as an approximation, from $\hat{x}$. This is the backward cycle consistency loss. The two losses are combined to compute the cycle consistency loss. References $D^x$ and $D^y$ Denote the discriminators that evaluate whether the generated images are real or artificial.

Thus, during training, the methods may include enforcing cycle consistency and/or spatial consistency between the candidate composite motion-compensated DSA image, and a combined image representing the inputted images, and/or enforcing cycle consistency and/or spatial consistency between the candidate DSA image 170, and the corresponding inputted image from the received DSA training image data 200.

With reference to FIG. 8, it is noted that in some examples, some of the parameters may be common to, i.e. shared between, the first discriminative model 240 and the second discriminative model 230. Since both the first and second discriminative models perform similar functions, i.e., they establish whether the generated image is artifact-free, the two discriminators may be assumed to learn similar features and parameters. By sharing parameters between the two discriminators, training time may be reduced because the duplication involved in independently learning parameters for the two discriminative models, is reduced. Further, by sharing parameters, the number of trainable parameters in the overall network is reduced, making the training more efficient.

Moreover, in some examples, the operation of adjusting parameters of the first generative model 160 and the first discriminative model 240 of the first neural network 140 is based further on the classification provided by the second discriminative model 230 of the second neural network 120. Providing this feedback from the second discriminative model to the first generative model further penalizes the first generative model if the composite image 190 generated by the second neural network 120 based on the output of the first neural network 140 is classified as artificial by the second discriminator 230. This additional penalizing provides additional context to the first neural network of the final output of the second neural network. For instance, if the first neural network 140 generates outputs that produce normalized activation of the most activated output unit of the discriminator 240 only slightly higher than say 0.5, then while the generated images 170 may be classified as real, they may not be sufficiently artifact-free to allow the second neural network 120 to successfully generate a composite motion-compensated DSA image 190. That is, the second discriminator, may not classify the generated composite image 190 as real or artifact-free. By providing feedback from the second discriminator 230 to the first neural network 140, the first generator 160 learns to generate images 170 that are sufficiently artifact-free to consistently allow the second neural network 120 to generate artifact-free composite images 190 from the artifact-free images 170 outputted by the first neural network 140.

In some examples, user input may also be received representing a region of interest. The region of interest may for example be a region in which a user desires particularly attention to the motion compensation. In this example, the method includes:

receiving user input indicative of a region of interest in the received DSA training image data 200 with artifacts 220; and applying a weighting to the reconstruction loss and/or to the discriminator loss such that a higher weighting is applied within the region of interest than outside the region of interest.

This has the effect of forcing the neural network to provide relatively fewer motion artifacts within the region of interest than outside the region of interest. The region of interest can alternatively be automatically identified.

Figure 10:
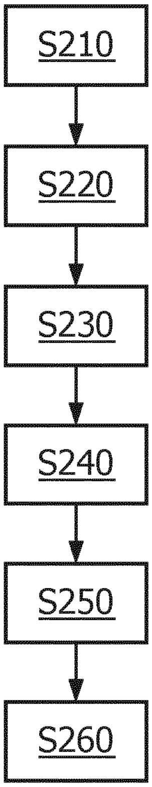
FIG. 10 is a flowchart illustrating an example method of training a neural network 120 to perform motion compensation on a temporal sequence of DSA images, in accordance with some aspects of the present disclosure.

FIG. 10 is a flowchart illustrating an example method of training a neural network 120 to perform motion compensation on a temporal sequence of DSA images, in accordance with some aspects of the present disclosure. The method illustrated in FIG. 10 may be used to train the neural network 120 described with reference to FIG. 5. The method may also be used to train the second neural network 120 described with reference to FIG. 8. The method may be augmented with the further method steps described in relation to FIG. 8 in order to also train the first neural network 140 in FIG. 8. With reference to FIG. 10, a computer-implemented method of training a generative adversarial network, GAN, comprising a generative model 180 and a discriminative model 230, to perform motion compensation on a temporal sequence of digital subtraction angiography, DSA, images 110 generated by subtracting a mask image, from a temporal sequence of contrast-enhanced images, comprises:

- receiving S210 DSA training image data 200 including a plurality of DSA images of the vasculature classified as having motion artifacts 220, and a plurality of DSA images of the vasculature classified as not having motion artifacts 210;
- inputting S220, from the received DSA training image data 200, the DSA images of the vasculature classified as having motion artifacts 220 into the generative model 180, and in response to the inputting, generating a candidate composite motion-compensated DSA image 190 by comparing the generated composite motion-compensated DSA image 190 with a combined image representing the inputted images, and computing a reconstruction loss based on the comparison;
- inputting S230 the candidate composite motion-compensated DSA image 190 into the discriminative model 230, and in response to the inputting S230, classifying S240 the inputted candidate composite motion-compensated DSA image 190 as either having motion artifacts or as not having motion artifacts, by comparing S250 the inputted candidate composite motion-compensated DSA image 190 with one or more DSA images of the vasculature classified as not having motion artifacts from the DSA training image data 200, and computing a discriminator loss based on the comparison; and
- adjusting S260 parameters of the generative model 180 and the discriminative model 230 based on the reconstruction loss and the discriminator loss, respectively.

Figure 11:
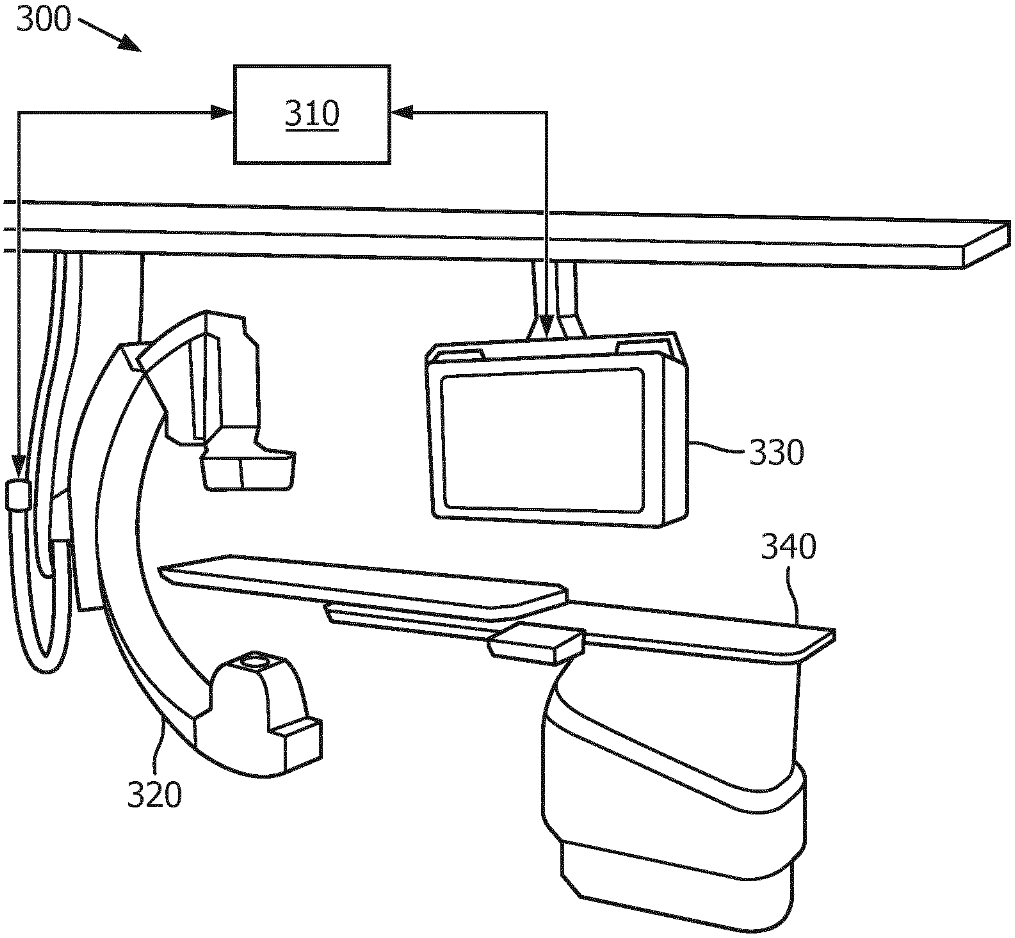
FIG. 11 is a schematic diagram illustrating an example system 300 for performing motion compensation on a temporal sequence of DSA images, in accordance with some aspects of the present disclosure.

FIG. 11 is a schematic diagram illustrating an example system 300 for performing motion compensation on a temporal sequence of DSA images, in accordance with some aspects of the present disclosure. The system 300 includes one or more processors 310 that are configured to perform one or more aspects of the above-described methods. The system 300 may also include an X-ray imaging system 320, as illustrated in FIG. 11, and which may be configured to provide a temporal sequence of contrast-enhanced images, from which DSA images are generated by subtracting a mask image, and upon which motion compensation, is performed. The system 300 may also include a display 330 for displaying the predicted composite motion-compensated DSA image 130 that is outputted by the above methods. The system 300 may also include a user interface device such as a keyboard, and/or a pointing device such as a mouse for controlling the execution of the method, and/or a patient bed 340. These items may be in communication with each other via wired or wireless communication, as illustrated in FIG. 11.

The above examples are to be understood as illustrative of the present disclosure and not restrictive. Further examples are also contemplated. For instance, the examples described in relation to the computer-implemented method, may also be provided by a computer program product, or by a computer-readable storage medium, or by a processing arrangement, or by the system 300, in a corresponding manner. It is to be understood that a feature described in relation to any one example may be used alone, or in combination with other described features, and may also be used in combination with one or more features of another of the examples, or a combination of other examples. Furthermore, equivalents and modifications not described above may also be employed without departing from the scope of the invention, which is defined in the accompanying claims. In the claims, the word "comprising" does not exclude other elements or operations, and the indefinite article "a" or "an" does not exclude a plurality. The mere fact that certain features are recited in mutually different dependent claims does not indicate that a combination of these features cannot be used to advantage. Any reference signs in the claims should not be construed as limiting their scope.

The invention claimed is:

1. A computer-implemented method of performing motion compensation on a temporal sequence of digital subtraction angiography (DSA) images, the computer-implemented method comprising:

- receiving a temporal sequence of DSA images of a vasculature generated by subtracting a mask image from a temporal sequence of contrast-enhanced images;
- inputting the temporal sequence of DSA images into a first neural network, wherein the first neural network is configured to output a corresponding temporal sequence of motion-compensated DSA images, wherein the motion-compensated DSA images include compensation for motion of the vasculature between the acquisition of each contrast-enhanced image in the temporal sequence and the acquisition of the mask image;
- inputting the corresponding temporal sequence of motion-compensated DSA images into a second neural network, wherein the second neural network predicts a composite motion-compensated DSA image that represents the predicted temporal sequence of motion-compensated DSA images and includes compensation for motion of the vasculature in the predicted temporal sequence of motion-compensated DSA images arising from corresponding motion of the vasculature between successive contrast-enhanced images in the temporal sequence;
- predicting, based on motion artifacts in the DSA images, a composite motion-compensated DSA image representing the temporal sequence of the DSA image and including (i) compensation for motion of the vasculature between successive contrast-enhanced images in the temporal sequence and (ii) compensation for motion of the vasculature between acquisition of the contrast-enhanced images in the temporal sequence and acquisition of the mask image; and
- outputting the predicted composite motion-compensated DSA image.

2. The computer-implemented method according to claim 1, wherein the second neural network is trained to predict, from the input of the temporal sequence, the composite motion-compensated DSA image by:

- receiving DSA training image data including a plurality of DSA images of the vasculature classified as not having motion artifacts, and a plurality of DSA images of the vasculature classified as having motion artifacts; and
- inputting the DSA images of the vasculature classified as having motion artifacts from the DSA training image data, into the neural network, and adjusting parameters of the neural network based on a first loss function representing a difference between a composite motion-compensated DSA image predicted by the second neural network, and a combined image representing the inputted DSA training image data, and based on a second loss function representing a probability of the composite motion-compensated DSA image predicted by the second neural network corresponding to a DSA image of the vasculature classified as not having motion artifacts from the DSA training image data.

3. The computer-implemented method according to claim 1, wherein the composite motion-compensated DSA image is predicted by the second neural network that comprises:

a generative model trained to predict, from the inputted temporal sequence of DSA images, a candidate composite motion-compensated DSA image representing the inputted temporal sequence of DSA images, and including compensation for the motion of the vasculature between successive contrast-enhanced images in the temporal sequence, and including compensation for motion of the vasculature between the acquisition of the contrast-enhanced images in the temporal sequence and the acquisition of the mask image; and wherein the neural network is configured to output the candidate composite motion-compensated DSA image to provide the composite motion-compensated DSA image.

4. The computer-implemented method according to claim 3, wherein the second neural network is trained to predict, from input of the temporal sequence, the composite motion-compensated DSA image, by:

providing a discriminative model, and training the generative model to predict, from the inputted temporal sequence of DSA images, a candidate composite motion-compensated DSA image representing the inputted temporal sequence of DSA images, by:

receiving DSA training image data including a plurality of DSA images of the vasculature classified as having motion artifacts, and a plurality of DSA images of the vasculature classified as not having motion artifacts;

inputting, from the received DSA training image data, the DSA images of the vasculature classified as having motion artifacts into the generative model, and in response to the inputting, generating a candidate composite motion-compensated DSA image by comparing the generated composite motion-compensated DSA image with a combined image representing the inputted images, and computing a reconstruction loss based on the comparison;

inputting the candidate composite motion-compensated DSA image into the discriminative model, and in response to the inputting, classifying the inputted candidate composite motion-compensated DSA image as either having motion artifacts or as not having motion artifacts, by comparing the inputted candidate composite motion-compensated DSA image with one or more DSA images of the vasculature classified as not having motion artifacts from the DSA training image data, and computing a discriminator loss based on the comparison; and adjusting parameters of the generative model and the discriminative model based on the reconstruction loss, and the discriminator loss, respectively.

5. The computer-implemented method according to claim 3, comprising at least one of enforcing cycle consistency and spatial consistency between the candidate composite motion-compensated DSA image, and a combined image representing the inputted images.

6. The computer-implemented method according to claim 1, wherein the first neural network comprises: a first generative model trained to predict, for each inputted DSA image in the temporal sequence, a candidate DSA image that includes compensation for the motion of the vasculature between the acquisition of the corresponding contrast-enhanced image in the temporal sequence and the acquisition of the mask image;

wherein the second neural network comprises: a second generative model configured to receive the candidate DSA images predicted by the first generative model, and to predict, from the received candidate DSA images, a candidate composite motion-compensated DSA image representing the received candidate DSA images, and including compensation for motion of the vasculature between successive contrast-enhanced images in the received candidate DSA images; and wherein the second neural network is configured to output the candidate composite motion-compensated DSA image to provide the composite motion-compensated DSA image.

7. The computer-implemented method according to claim 1, wherein the second neural network is trained to predict, from the inputted temporal sequence, the composite motion-compensated DSA image, by:

providing a first discriminative model, and training the first generative model to predict, for each inputted DSA image in the temporal sequence, a candidate DSA image that includes compensation for the motion of the vasculature between the acquisition of the corresponding contrast-enhanced image in the temporal sequence and the acquisition of the mask image, by:

receiving DSA training image data including a plurality of DSA images of the vasculature classified as having motion artifacts, and a plurality of DSA images of the vasculature classified as not having motion artifacts;

inputting, from the received DSA training image data, the DSA images of the vasculature classified as having motion artifacts into the first generative model, and in response to the inputting, generating for each inputted image, a candidate DSA image that includes compensation for motion of the vasculature between the acquisition of the corresponding contrast-enhanced image and the acquisition of the mask image, by comparing each generated candidate DSA image with the corresponding inputted DSA image of the vasculature from the received DSA training image data, and computing a first reconstruction loss based on the comparison;

inputting the candidate DSA image into the first discriminative model, and in response to the inputting, classifying the inputted candidate DSA image as either having motion artifacts or as not having motion artifacts, by comparing the inputted candidate DSA image with one or more DSA images of the vasculature classified as not having motion artifacts from the DSA training image data, and computing a first discriminator loss based on the comparison;

adjusting parameters of the first generative model and the first discriminative model based on the first reconstruction loss and the first discriminator loss, respectively;

providing a second discriminative model, and training the second generative model to predict a candidate composite motion-compensated DSA image, by:

inputting the temporal sequence of candidate DSA images generated by the first generative model into the second generative model, and in response to the inputting, generating a candidate composite motion-compensated DSA image by comparing the generated composite motion-compensated DSA image with a combined image representing the inputted images, and computing a second reconstruction loss based on the comparison;

inputting the candidate composite motion-compensated DSA image into the second discriminative model, and in response to the inputting, classifying the inputted candidate composite motion-compensated DSA image as either having motion artifacts or as not having motion artifacts, by using the second discriminative model to compare the inputted candidate composite motion-compensated DSA image with one or more DSA images classified as not having motion artifacts from the DSA training image data, and computing a second discriminator loss based on the comparison; and adjusting parameters of the second generative model and the second discriminative model based on the second reconstruction loss, and the second discriminator loss, respectively.

8. The computer-implemented method according to claim 7, comprising enforcing cycle consistency and/or spatial consistency between the candidate DSA image, and the corresponding inputted image from the received DSA training image data.

9. The computer-implemented method according to claim 7, wherein at least some of the parameters of the first discriminative model of the first neural network are common to the first discriminative model of the first neural network and the second discriminative model of the second neural network.

10. The computer-implemented method according to claim 7, wherein the adjusting parameters of the first generative model and the first discriminative model of the first neural network is based further on the classification provided by the second discriminative model of the second neural network.

11. The computer-implemented method according to claim 7, comprising receiving user input indicative of a region of interest in the received DSA training image data; and applying a weighting to the reconstruction loss and/or to the discriminator loss such that a higher weighting is applied within the region of interest than outside the region of interest.

12. The computer-implemented method according to claim 1, wherein the second neural network is trained to predict, from the input of the temporal sequence, the composite motion-compensated DSA image, the method further comprising training a generative adversarial network (GAN) comprising a generative model and a discriminative model to perform motion compensation on a temporal sequence of digital subtraction angiography (DSA) images generated by subtracting a mask image, from a temporal sequence of contrast-enhanced images, the method comprising:

receiving DSA training image data including a plurality of DSA images of the vasculature classified as having motion artifacts, and a plurality of DSA images of the vasculature classified as not having motion artifacts;

inputting, from the received DSA training image data, the DSA images of the vasculature classified as having motion artifacts into the generative model, and in response to the inputting, generating a candidate composite motion-compensated DSA image by comparing the generated composite motion-compensated DSA image with a combined image representing the inputted images, and computing a reconstruction loss based on the comparison;

inputting the candidate composite motion-compensated DSA image into the discriminative model and in response to the inputting, classifying the inputted candidate composite motion-compensated DSA image as either having motion artifacts or as not having motion artifacts, by comparing the inputted candidate composite motion-compensated DSA image with one or more DSA images of the vasculature classified as not having motion artifacts from the DSA training image data, and computing a discriminator loss based on the comparison; and adjusting parameters of the generative model and the discriminative model based on the reconstruction loss and the discriminator loss, respectively.

13. A non-transitory computer-readable storage medium having stored a computer program comprising instructions which, when executed by a processor, cause the processor to:

receive a temporal sequence of DSA images of a vasculature generated by subtracting a mask image from a temporal sequence of contrast-enhanced images;

input the temporal sequence of DSA images into a first neural network, wherein the first neural network is configured to output a corresponding temporal sequence of motion-compensated DSA images, wherein the motion-compensated DSA images include compensation for motion of the vasculature between the acquisition of each contrast-enhanced image in the temporal sequence and the acquisition of the mask image;

input the corresponding temporal sequence of motion-compensated DSA images into a second neural network, wherein the second neural network predicts a composite motion-compensated DSA image that represents the predicted temporal sequence of motion-compensated DSA images and includes compensation for motion of the vasculature in the predicted temporal sequence of motion-compensated DSA images arising from corresponding motion of the vasculature between successive contrast-enhanced images in the temporal sequence;

predict, based on motion artifacts in the DSA images, a composite motion-compensated DSA image representing the temporal sequence of DSA image and including (i) compensation for motion of the vasculature between successive contrast-enhanced images in the temporal sequence and (ii) compensation for motion of the vasculature between acquisition of the contrast-enhanced images in the temporal sequence and acquisition of the mask image; and output the predicted composite motion-compensated DSA image.

14. A system for performing motion compensation on a temporal sequence of digital subtraction angiography (DSA), the system comprising:

a processor communicatively coupled to a memory, the processor configured to:

receive a temporal sequence of DSA images of a vasculature generated by subtracting a mask image from a temporal sequence of contrast-enhanced images;

input the temporal sequence of DSA images into a first neural network, wherein the first neural network is configured to output a corresponding temporal sequence of motion-compensated DSA images, wherein the motion-compensated DSA images include compensation for motion of the vasculature between the acquisition of each contrast-enhanced image in the temporal sequence and the acquisition of the mask image;

input the corresponding temporal sequence of motion-compensated DSA images into a second neural network, wherein the second neural network predicts a composite motion-compensated DSA image that represents the predicted temporal sequence of motion-compensated DSA images and includes compensation for motion of the vasculature in the predicted temporal sequence of motion-compensated DSA images arising from corresponding motion of the vasculature between successive contrast-enhanced images in the temporal sequence;

predict, based on motion artifacts in the DSA images, a composite motion-compensated DSA image representing the temporal sequence of DSA image and including (i) compensation for motion of the vasculature between successive contrast-enhanced images in the temporal sequence and (ii) compensation for motion of the vasculature between acquisition of the contrast-enhanced images in the temporal sequence and acquisition of the mask image; and output the predicted composite motion-compensated DSA image.

15. The non-transitory computer-readable storage medium according to claim 13, wherein the instructions, when executed by the processor, further cause the processor to:

apply a machine-learning model to predict the composite motion-compensated DSA image, the machine-learning model trained based a plurality of DSA images of the vasculature classified as not having motion artifacts and a plurality of DSA images of the vasculature classified as having motion artifacts.

16. The system according to claim 14, wherein the processor is further configured to:

apply a machine-learning model to predict the composite motion-compensated DSA image, the machine-learning model trained based on a plurality of DSA images of the vasculature classified as not having motion artifacts and a plurality of DSA images of the vasculature classified as having motion artifacts.

* * * * *